United States Patent [19]

Ranucci

[11] 3,760,075
[45] Sept. 18, 1973

[54] ULTRASONIC DEAGGREGATION OF THE COPPER COMPLEX OF -METHOXY-1-PHENAZINOL 5,10-DIOXIDE

[75] Inventor: Joseph Anthony Ranucci, Bloomfield, N.J.

[73] Assignee: Hoffmann-LaRoche, Inc., Nutley, N.J.

[22] Filed: Apr. 23, 1971

[21] Appl. No.: 139,290

[52] U.S. Cl. .............................................. 424/245
[51] Int. Cl. .......................................... A61k 27/00
[58] Field of Search ................................... 424/245

[56] References Cited
UNITED STATES PATENTS 3,586,674   6/1971   Leimgruber et al. ............... 260/242

Primary Examiner—Albert T. Meyers
Assistant Examiner—Vincent D. Turner
Attorney—Samuel L. Welt, Jon S. Saxe, Bernard S. Leon, Gerald S. Rosen, R. Hain Swope and William M. Farley

[57] ABSTRACT

Copper complexes of 6-lower alkoxy-1-phenazinol 5,10-dioxides and, in particular, the copper complex of myxin, 6-methoxy-1-phenazinol 5,10-dioxide, are prepared in micronized form, i.e., having discrete particles of less than 20 microns in size, by ultrasonic deaggregation of the copper complex aggregates.

3 Claims, No Drawings

ULTRASONIC DEAGGREGATION OF THE COPPER COMPLEX OF -METHOXY-1-PHENAZINOL 5,10-DIOXIDE

BACKGROUND OF THE INVENTION

Copper complexes of 6-lower alkoxy-1-phenazinol 5,10-dioxide are generally prepared by combining a solution of a 6-lower alkoxy-1-phenazinol 5,10-dioxide with a solution of a copper salt. The precursors, 6-lower alkoxy-1-phenazinol 5,10-dioxides, are readily prepared by selective alkylation of iodinin (1,6-phenazinol 5,10-dioxide) as, for example, by treating the sodium salt of iodinin with an alkylating agent such as di-lower alkoxy sulfate in an inert organic solvent. A solution of the 6-lower alkoxy-1-phenazinol 5,10-dioxide when combined with a solution of a cupric salt, e.g., cupric acetate, forms a copper complex containing 1 mole of copper for every 2 moles of 6-lower alkoxy-1-phenazinol 5,10-dioxide. Other cupric salts include those of weak acids having pKas' of about 4,2 or higher, such as propionic or benzoic acids and those of mineral acids, such as cupric sulfate, which must be used in buffered solvent systems to avoid highly acidic conditions.

The reaction can be carried out at room temperatures or temperatures above room temperature can be used to facilitate solution of the reactants and reduce the amount of solvent needed. Since it is desirable to precipitate the final products from the reaction medium, it is preferred to utilize a solvent or solvent mixture in which both the 6-lower alkoxy-1-phenazinol 5,10-dioxide and the cupric salt are more soluble than the complex formed by their reaction. Exemplary organic solvents which can be conveniently employed include acetonitrile, methanol, ether, chloroform, etc.

In addition, when prepared by these methods, 90 percent of the copper complex particles are below 10 microns in size and, in fact, usually below 5 microns with the remaining 10 percent below 20 microns in size. On standing, the particles in the pure form have a strong tendency to form aggregates of from about 400 to about 600 microns in size. However, the copper complexes of 6-methoxy-1-phenazinol 5,10-dioxide must have an initial particle size distribution of 5–20 microns to provide an increased surface area and to afford sufficient dispersion so as to achieve an effective degree of physiological activity in the various pharmaceutical preparations. The increased surface area of the particles of the micronized copper myxin is efficacious since it results in a higher level of activity of the complex in contact with the infected area. Since the material is thermal, shock and static sensitive, the conventional means of deaggregation, e.g., jet-milling or attrition, are not acceptable because of the explosion hazard.

The novel cupric complex of 6-methoxy-1-phenazinol 5,10-dioxide has a high degree and wide spectrum of antimicrobial activity in both in vitro and in vivo topical infections. In particular, the cupric complex of 6-methoxy-1-phenazinol 5,10-dioxide has demonstrated a high level of activity against a wide variety of both Gram-positive and Gram-negative bacteria, fungi, protozoa and helminths. This wide spectrum of antimicrobial activity has manifested itself by the efficacy of the copper complex as a chemotherapeutical agent in combatting topical infections.

BRIEF SUMMARY OF THE INVENTION

Copper complex aggregates are safely reduced to their micronized form—discrete particles of the required size distribution by the use of ultrasonic techniques.

DETAILED DESCRIPTION OF THE INVENTION

In its broadest embodiment, this invention provides a process for the deaggregation of thermal and/or shock sensitive materials.

In a more limited embodiment, this invention provides a process for the deaggregation of the copper complex of 6-lower alkoxy-1-phenazinol 5,10-dioxide.

In a specific preferred embodiment, this invention provides a process for the deaggregation of the copper complex of 6-methoxy-1-phenazinol 5,10-dioxide, hereinafter referred to as copper myxin, to discrete particles of 5–20 microns size, thus providing an increased surface area and facilitating the solubilization of physiologically effective quantities in pharmaceutical preparations.

To achieve any degree of physiological activity it is essent-ial that the particle size of the copper complexes be reduced to their micronized form to provide an increased surface area and to facilitate solubilization in pharmaceutical formulations.

Myxin and its copper complex are strongly exothermic and decompose violently at 149°C. when heated at 20°C. per minute. Even when heated slowly (1°C. per minute) from 120° to 140°C. there is a 70–80 percent breakdown to 6-methoxy-1-phenazinol-10-oxide. Furthermore, the copper-myxin complex has decomposed violently under the impact of a milling procedure or other method of micronization involving the material in the dry state.

Faced with these incongruities, it was all the more surprising to discover that, by the use of ultrasonic techniques, the copper myxin aggregates are effectively and safely reduced to aqueous or solvent dispersions wherein discrete particles are present in the desired particle size range.

The process of this invention is carried out by subjecting the copper myxin complex to sound frequencies in the ultrasonic range. This is done by inserting a probe which is connected to an ultrasonic frequency-producing apparatus into a container of the material being treated and vibrating the probe at ultrasonic frequencies. A suitable apparatus is a Sonifier cell disruptor as supplied by Branson Sonic Power, which produces sound frequencies of up to 18–20 kilohertz. Application of that sound frequency for about 2 minutes to a copper-myxin complex produces the fine particle deaggregated material with no breakdown of the complex.

The degree of deaggregation caused by the ultrasonic insonation is a function of time and both sound frequency and intensity. This invention is not limited to any sound frequency as long as it is within the ultrasonic range. The time and intensity factors are important only in that treatment for sufficient time with sufficient intensity to achieve the desired effect is required. Hence, other time and frequency-intensity combinations are equally suitable in producing the compounds of this invention.

Sufficient solvent is added to the copper-myxin complex aggregates in the container to wet and completely cover them and the aggregates are rapidly and completely disrupted to fine particles in the solvent dispersion by activation of the ultrasonic generator probe inserted into the solvent. Other techniques are, of course, equally effective. For example, a vessel containing aggregates and solvent can be placed in a water-filled immersion tank and subjected to ultrasonic vibrations transmitted through the water by a source located exterior to the tank. These dispersions can be used directly in the requisite pharmaceutical formulations.

Although some fine particles may flocculate upon standing for extended periods of time, the disrupted material does not form aggregates and the particles may be easily redispersed by stirring.

The choice of solvent is not critical, limiting criteria being a suitable surface tension to insure wetting of the cohesive aggregates and, since the complex dispersion is preferably added directly to the pharmaceutical preparations, compatability with the excipients in various pharmaceutical creams, ointments, suspensions and solutions. Representative solvents include water, carbon tetrachloride, acetone and Isopar, (a highly purified, saturated $C_{12} - C_{14}$ branched-chain hydrocarbon from Humble Oil and Refinery Co.).

The following example illustrates the invention.

EXAMPLE 1

This example illustrates the deaggregation of a copper-myxin complex and the solvent dispersion of the resulting fine particles.

Ten grams of copper myxin aggregates are added to a 250 ml. beaker and 15 grams of Isopar, sufficient to wet and completely cover the copper-myxin complex, are added. The probe of an ultrasonic generator (e.g., a Sonifier cell disruptor as supplied by Branson Sonic Power) is inserted into the solvent and power sufficient to effect cavitation (the tearing action generated by the resulting strong compound waves) and disperse the copper myxin is applied (70 watts for 2 minutes). As the deaggregation proceeds, the reduction in particle size results in increased particle-particle contact with a consequent increase in viscosity, a factor which causes a decrease in the ability of the solvent medium to transmit sound. However, this effect can be neutralized by reducing the viscosity by the addition of more solvent.

After cavitation is stopped, a green-black dispersion of fine particles of copper myxin has formed. After standing 5 days, some fine particles settled out but there is no tendency to permanently reform aggregates since the particles are readily dispersed by stirring.

The particle size distribution is determined by microscopic examination using a calibrated scale. Ninety percent of the particles are less than 10 microns in diameter and the remaining 10 percent are below 20 microns.

The thus-formed dispersions are suitable for direct use in various pharmaceutical formulations. Their efficacy as chemotherapeutic agents has been shown in otic/ophthalmic preparations and in cream and ointment formulations.

I claim:

1. A process for the deaggregation and dispersion of the antimicrobial agent 6-methoxy-1-phenazinol 5,10-dioxide cupric complex which comprises:

a. covering and wetting the aggregates of 6-methoxy-1-phenazinol 5,10-dioxide, cupric complex with a pharmaceutically acceptable solvent, said solvent having a suitable surface tension to insure wetting of the 6-methoxy-1-phenazinol 5,10-dioxide, cupric complex aggregates;

b. placing the thus-wetted aggregates in contact with an ultrasonic generator and c. exposing the thus-wetted aggregates to ultrasonic waves for a time sufficient to deaggregate the 6-methoxy-1-phenazinol 5,10-dioxide, cupric complex without breaking the complex, thereby deagggregating and dispersing the 6-methoxy-1-phenazinol 5,10-dioxide, cupric complex in the solvent in discrete particles of from 5 to 20 microns in diameter.

2. A process as described in claim 1 wherein the ultrasonic waves are generated by a probe inserted in the aggregate-solvent mix.

3. A composition prepared by the process of claim 1 comprising a dispersion of the antimicrobial 6-methoxy-1-phenazinol 5,10-dioxide, cupric complex in a pharmaceutically acceptable solvent compatible with the excipients in pharmaceutical formulations and having a suitable surface tension to insure wetting of the 6-methoxy-1-phenazinol 5,10dioxide, cupric complex aggregates wherein the discrete particles of the 6-methoxy-1-phenazinol 5,10-dioxide, cupric complex are from 5 to 20 microns in diameter.

* * * * *